United States Patent [19]

Raffensperger

[11] Patent Number: 4,734,291

[45] Date of Patent: Mar. 29, 1988

[54] PROCESS FOR PREPARING SHELF STABLE AL DENTE COOKED PASTA

[75] Inventor: Stanley P. Raffensperger, Lewisburg, Pa.

[73] Assignee: American Home Food Products, Inc., New York, N.Y.

[21] Appl. No.: 877,624

[22] Filed: Jun. 23, 1986

[51] Int. Cl.⁴ .................. A23L 3/00; A23L 1/16
[52] U.S. Cl. .................. 426/325; 426/557; 426/407; 426/412; 426/402; 426/410
[58] Field of Search .......... 426/557, 451, 407, 410, 426/402, 412, 399, 400, 401, 324, 325, 326

[56] References Cited

U.S. PATENT DOCUMENTS

| | | | |
|---|---|---|---|
| 1,634,332 | 7/1927 | McGowan | 426/557 |
| 2,073,339 | 3/1937 | Eberts | 426/402 |
| 2,434,388 | 1/1948 | Brehm | 426/325 |
| 2,594,213 | 4/1952 | Rahn | 426/325 |
| 2,616,810 | 11/1952 | Gallenkamp | 426/325 |
| 3,061,440 | 10/1962 | Johannes | 426/407 |
| 3,393,077 | 7/1968 | Moreau | 426/410 |
| 3,454,406 | 7/1969 | Alderton | 426/325 |
| 3,886,296 | 5/1975 | Brooks et al. | 426/325 |
| 4,262,027 | 4/1981 | Tonner et al. | 426/325 |
| 4,469,711 | 9/1984 | Seltzer | 426/557 |
| 4,552,772 | 11/1985 | Saiton et al. | 426/557 |
| 4,597,976 | 7/1986 | Doster et al. | 426/325 |

FOREIGN PATENT DOCUMENTS

| | | | |
|---|---|---|---|
| 1071920 | 2/1980 | Canada | 426/325 |
| 0128610 | 5/1984 | European Pat. Off. | 426/325 |
| 2921041 | 11/1979 | Fed. Rep. of Germany | 426/407 |
| 2502907 | 10/1982 | France | |
| 48-2778 | 1/1973 | Japan | 426/412 |
| 53-37423 | 10/1978 | Japan | 426/557 |
| 55-77867 | 6/1980 | Japan | 426/557 |
| 56-148250 | 11/1981 | Japan | 426/557 |
| 58-11182 | 3/1983 | Japan | 426/557 |
| 58-38948 | 8/1983 | Japan | 426/131 |
| 58-183053 | 10/1983 | Japan | 426/557 |
| 59-102365 | 6/1984 | Japan | 426/557 |
| 60-16563 | 1/1985 | Japan | 426/557 |
| 2061693 | 5/1981 | United Kingdom | 426/324 |

OTHER PUBLICATIONS

Modern Packaging, 10/69, p. 133 plus.

Primary Examiner—Steven Weinstein
Attorney, Agent, or Firm—Arthur E. Wilfond

[57] ABSTRACT

An al dente pasta product having storage stability is produced by partially cooking freshly extruded pasta with steam or boiling water. Measured amounts of the partially cooked pasta are sealed in a container with measured amounts of water sufficient to complete hydration to 65% to 75% moisture and measured amounts of a food grade acid sufficient to reduce the pH to 4.6 or less. The sealed containers may be commercially sterilized under moderate thermal processing conditions. In a specific embodiment, the containers contain pasta in a carbon dioxide atmosphere.

2 Claims, No Drawings

PROCESS FOR PREPARING SHELF STABLE AL DENTE COOKED PASTA

This invention relates to an improved commercial process for making packaged pasta and to an improved hydrated, i.e. precooked, pasta product which is marketable in flexible containers and shelf stable.

Copending application of Robert L. Stahl, Ser. No. 653,653 filed Sept. 21, 1984 to Shelf Stable Pasta, and now abandoned, described much of the background of this invention. Said application indicated that prior art processes have been devised to reduce the pH of the precooked pasta to below pH 4.5, thus creating an acid environment in which fewer microorganisms can exist and which can be commercially sterilized at lower temperatures for shorter times. The marination of blanched pasta has long been known for imparting a flavor to pasta, which was to be served cold, as in salads and the like and is described in U.S. Pat. No. 2,434,388. U.S. Pat. No. 3,886,296 describes a process for reducing the overall pH of pasta by blanching the pasta with a hot acidic solution for 1 to 15 minutes and then packaging the acid-blanched pasta with an acidic, condiment-containing liquid phase in a container to reduce the overall pH of the pasta plus condiment liquid to pH 4.5, or less. After sealing, the container is sterilized at a maximum temperature of 212° F. for a maximum period of 15 minutes. However, pasta blanched in an acid solution becomes gummy and less extensible, and the water pickup is limited. French patent application No. 82 05572 (publication No. 2,502,907) describes a process for preparing shelf stable pasta products in which the dough is first precooked in boiling acidified water, rinsed in cold acidified running water and coated with vegetable oil. The oil coated product is placed into a flexible plastic pouch, which is evacuated prior to vacuum sealing.

Japanese Published Patent Application Publication No. 78 37423 discloses a process for preparing shelf stable noodles. In that process, boiled noodles are quickly cooled with cold water, and drained. The noodles are dipped into a low pH acid solution of malic acid for a short time, typically forty seconds, immediately after draining, to form a film of the acid solution on the surface of the noodles. The boiled noodles with the surface acid are placed into plastic bags which are sealed and heated to sterilize. The process has the deficiency that only the surface of the noodle is acidified while the center remains at a high pH. Mixed results are obtained with this process. Sealed containers kept at room temperature remain good for twenty five days. Longer shelf life was not achieved. Packaged noodles subjected to accelerated stability testing by storage at elevated temperatures such as 32°-35° C. spoiled after four days. An additional step of degasifying or evacuating the air in the plastic containers was necessary for further stability. Packaged noodles, which were degasified, subsequent to filling and prior to sealing, could be incubated indefinitely at 32°-35° C. without spoilage. The process described in this application eliminates the need to degasify plastic containers prior to sealing.

Japanese Publication No. 78 37423 describes other prior art processes. There is described a prior process of treating the surfaces of noodles by dipping noodles that have been heat treated by steaming or boiling into a dilute solution of acetic acid and directly steaming them with live steam. This process has the disadvantage that the dilute acetic acid solution does not sufficiently adhere to the surface of the noodles and that the live steam impingement causes the acid solution to be removed from the surface of the noodles together with hydrated starch. In another prior process, boiled noodles are washed and cooled with cold water and then dipped into a hydrogen peroxide aqueous solution to form a film of hydrogen peroxide aqueous solution on the surface of the noodles. However, nascent oxygen evolves immediately into the open air and its bactericidal effect is lost, unless the noodles are immediately placed into sealed synthetic resin pouches. The hydrogen peroxide remaining in the noodles is not desirable.

A further process described therein, for keeping raw noodles, adds fumaric acid or glutamic acid covered with an oil or fat, having a 50°-85° C. melting point. However, the acid remains in the noodles and the residual acidity adversely affects the taste and is undesirable. Furthermore, in the boiling step, some of the acid on the surface of the noodles is eluted into hot water and therefore the acid is diluted on the surface of the noodles, thus lowering the bacteriostasis, i.e. the inhibition of bacterial growth. Bacteriostasis is further lowered during the step of washing with water and draining. The noodles must be dipped in hydrogen peroxide, which is undesirable.

Brooks et al, in U.S. Pat. No. 3,886,296, describes a process wherein pasta, as a particulate food phase, having a pH of about 5.5–6.0 is acid blanched by immersing the pasta for about 10 minutes in a malic acid solution having a temperature of 212° F. and a pH of 3.5. The acid blanched pasta has a pH of below 4.5. The acid blanched pasta, at a pH of 4.2 and at a temperature of about 200° F. is then added to the cans in an amount sufficient to cover the pasta. The cans are then sealed, inverted, and heat processed for 15 minutes at 212° F. The cans are then quenched with cool water to reduce the temperature of the cans below about 120° F. The resulting product is commercially sterile.

The nature of thermal process requirements for commercial sterility is described in "Sterilization in Food Technology", by C. O. Ball and F. C. W. Osborn, McGraw-Hill, 1957.

There is a consumer need for precooked hydrated pasta in certain types of containers which has not been satisfied because the containers are made of materials, which cannot withstand the conditions used by the canning industry for commercial sterilization, for instance, steam table trays for institutional use and flexible pouches for consumer use.

It is an object of this invention to provide an improved cooked pasta product.

It is a further object of this invention to provide an improved pasta product which may be commercially sterilized for shorter times and at lower temperatures and has improved storage stability than existing pasta products.

Another object of this invention to provide an improved pasta product in a plastic pouch container.

Still another object of this invention to provide a process for making shelf stable cooked pasta marketable in plastic containers, which eliminates the prior art evacuation of headspace air or gas. Furthermore, as an object, the invention decreases the likelihood of the pasta strands from clumping together.

It is a still further object of this invention to provide a commercially sterile, storage stable pasta product, which may be packaged in containers otherwise not feasible for such purpose because the container integrity is lost when subjected to elevated temperature and time, thermal processes.

Stahl, in aforementioned application Ser. No. 653,653 claims a process for preparing an acidifed shelf stable al dente pasta, which comprises essentially the steps of blanching substantially dried pasta in boiling water substantially free of acid, contacting said blanched pasta with a food grade aqueous acid solution having a pH between 1.5 and about 3.5 for a sufficient time to reduce the pH of the center of a pasta strand to between 3.8 and about 4.6 to produce an acidified pasta product, substantially removing said food grade aqueous acid solution from said acidified pasta, placing said acidified pasta into a container, sealing said container and heating the contents of said sealed container at a temperature of no greater than about 220° F. for time sufficient to sterilize said contents.

I have found that excellent result can be obtained by using a system different from the above described prior art process and from the Stahl process by steaming freshly extruded pasta having a water content of 25% to 35%, preferably 30 percent by weight to cook partially the pasta and to denature or set the protein and to hydrate partially the starch. The additional water pickup by the steaming process to a water content of 45% to 55% by weight, and preferably 45%. Measured portions of the partially hydrated pasta are placed in a food grade plastic pouches along with measured amounts of water sufficient to complete hydration to a water content of 65–75% and measured amounts of a food grade acid sufficient to reduce the pH to 4.6 or less and preferably 4.2 to 4.4. Preferably, the food grade acid is dissolved in the added water. In a preferred embodiment eight parts by weight of fumaric acid are dissolved in 1,000 parts by weight of water. Thereafter, the containers are sealed and sterilized (pasteurized) by immersion in steam at 220° F. or boiling water for 8 to 15 minutes, and preferably ten minutes.

The thermal processing requirements to achieve commercial sterility are reduced. That is, the temperature and time required to sterilize commercially the product are reduced. The final temperature and time of heating are dependent on the fill temperature, geometry of container and product characteristics. That is, the center of the pasta, at the coldest spot in the container, must reach the minimum sterilization temperature.

In a preferred embodiment, the acidified pasta may be packaged into plastic pouches, sealed and sterilized by immersing the pouches in boiling water under air pressure for eight or more minutes. The sterilized, pouched product has been found to have an extended shelf life of several months or longer even at elevated temperatures such as 95° F. The prior art step of degasifying the filled pouch is eliminated. The shelf stable pasta in the pouch retains its integrity as to texture, to appearance and to sensory properties. The product is ready-for-use in a manner similar to home cooked dry spaghetti. That is, the pouch is opened and the acidified pasta covered with hot water, drained, and is then ready to eat when covered with a heated tomato sauce.

In another preferenced embodiment, the pouch is vacuum sealed to remove air and the oxygen contained therein thereby improving storage stability by minimizing oxidative flavor changes. The elimination of air also improves the heat transfer coefficient at the start of the pasteurization process (pressurized water or steam), reducing processing time-temperature to achieve commercial sterility. Encapsulated sodium bicarbonate, such as available for Durkee Industrial Foods, Cleveland, Ohio, in the formulation is released at temperatures above 150° F. in the pasteurization step and reacts with part of the fumaric acid to form carbon dioxide gas in an amount of approximately 30–35% of package volume. This gas prevents clumping and sticking which occurs in a vacuum packed pouch. Both the carbon dioxide gas in the pouch and the carbonic acid dissolved in the hydrated spaghetti have a bacterostatic effect and further contribute to microbial stability.

Conveniently, the tomato sauce may be separately packaged in a plastic pouch. A complete meal package for the consumer may contain a pouch of precooked pasta, a pouch of tomato sauce and optionally, may also contain a pouch of grated cheese.

The plastic container may be any food grade, temperature stable packing system. One such container is multi-layered having a liner of low density polyethylene, an aseptic layer of standard polyethylene and a polypropylene sealant. Suitable materials include Mylar, Saran and ethyl vinyl alcohol.

The preferred acidulant is an aqueous solution of fumaric acid, but any other food grade acid, such as citric, tartaric or malic, lactic or mixture thereof, may be used. The pH of various food grade acids ranges between about 1.5 to 3.5 depending on the concentration. (Handbook of Food Additives 2nd Edition, Vol. 1, pg. 235, 1977). Fumaric acid is the acid-of-choice. Fumaric acid is the most efficient food organic acid for acidulating partially hydrated pasta to a pH of 4.5 or less. When fumaric acid is used the taste of the pasta is barely distinguishable from the non-acidified control.

It has been found that a superior product is made by starting with freshly extruded pasta rather than dried pasta. The extruded pasta, fresh from the extruder, typically contains about 28 to 30 percent moisture. The preferred pasta is made from Semolina flour. Sufficient firmness is obtained without additives such as egg white and/or glycerol monostearate.

The order of the processing steps before and after the acidification step is critical. It has been found that the pasta must be acidified after extruding. The acidified aqueous solution may not be added to the flour mix prior to extrusion because the "standard of identity" of the pasta under applicable governmental regulations is not met with a pre-acidified product. In addition, the resulting product does not possess desirable quality properties.

The pasta itself has a firm texture. There is a general feeling in some segments of the public that a product in a clear container, that can be seen, is of higher quality than a product in a can. While "al dente" is a subjective quality in cooked pasta, it is a description applied by consumers to pasta having about a 3.0 to 3.2 water pickup fold.

While the process has been described with regard to plastic containers, it is also applicable to metal cans. The reduction in sterilization time and temperature results in higher quality product particularly in the larger size cans, such as number 10 cans. The present product is not limited by the type of packaging components. The container need only be sufficient to withstand the lower sterilization temperature of about 190° F. Flexible plastic pouches and also rigid plastic containers and trays for steam tables may be used.

The process may be summarized as a process for preparing shelf stable cooked al dente pasta comprising sequentially:
A. spraying steam on freshly extruded pasta having a water content of 25% to 35% percent by weight to partially cook the pasta by raising the water content to 45% to 55% percent by weight;
B. inserting measured amounts of said partially blanched pasta into a container of food grade plastic;
C. adding 7.0 to 10.0 ounces per pound of an aqueous acid solution having a pH of 2.2 to 2.4 to each container;
D. sealing said containers; and
E. sterilizing said sealed container.

More specifically the process may be summarized as a process for preparing shelf stable cooked al dente pasta comprising sequentially:
A. spraying steam on freshly extruded pasta having a water content of about 30 percent by weight to partially blanch the pasta by raising the water content to about 45 to 55% percent by weight;
B. inserting measured amounts of said partially blanched pasta into a container of food grade plastic;
C. adding about 50 percent of aqueous solution by weight based on the weight of the partially blanched pasta to each of said containers to raise the water content of the pasta to about 70% by weight;
D. said solution containing 0.8 percent of fumaric acid;
E. sealing said containers; and
F. sterilizing said sealed container.

The product of my invention may be summarized as a clump-free shelf stable al dente pasta product, consisting essestially of a sterile food grade container, containing blanched pasta, detectable amounts of a food grade acid, and a carbon dioxide atmosphere.

The following examples are given by way of illustration and are not intended to limit the ambit of the appended claims.

EXAMPLE 1

This example illustrates the preparation of spaghetti for sale in a pouch pack.

Freshly extruded spaghetti (90 grams) made of durum granular and having a moisture content of 32% moisture was sprayed with steam at atmospheric pressure give a moisturized product of 130 grams. The partially blanched spaghetti was weighed into 130 gram portions and inserted into a food grade, clear flexible pouches such as those available from American Can. To each pouch, was added 60 g. of water containing 0.48 g. of fumaric acid. The contents were allowed to equilibrate. The equilibrium pH was 4.0. The pouches were heat sealed and sterilized by placing them in water at 220° F. with an air pressure override for ten minutes. The water and pouches were cooled to 160° F.

The sterilized pouches were stored for three months with no evidence of deterioration or growth of microorganisms. The spaghetti, after three months storage at room temperature, was firm and had no off-taste.

Some of the sterilized pouches were stored at 90° F. and inspected monthly. No evidence of deterioration was seen after six months of storage at this elevated temperature.

EXAMPLE 2

This example illustrates the preparation of spaghetti for sale in a pouch pack.

Freshly extruded spaghetti (950 grams) made of durum granular and having a moisture content of 30 percent by weight was sprayed with steam at atmospheric pressure to a weight of 1270 grams. The partially blanched spaghetti was weighed into 120 gram portions and inserted into a food grade, clear plastic pouches. To each pouch was added 70 g. of water containing 0.30 g. of fumaric acid. The contents were allowed to equilibrate, the pH was 4.3. The pouches were heat sealed, and sterilized by placing them in water at 240° F. with an air pressure override for seven minutes. The pouches were cooled to 160° F. and the pressure released.

The sterilized pouches were stored for three months with no evidence of deterioration or growth of microorganisms. The spaghetti, after three months storage was firm, with no off-taste.

Some of the sterilized pouches were stored at 90° F. and inspected monthly. No evidence of deterioration was seen after six months of storage at this elevated temperature.

EXAMPLE 3

This example illustrates the preparation of spaghetti for sale in a pouch pack.

Freshly extruded spaghetti (1000 grams) made of durum granular and having a moisture content of 30 percent by weight was sprayed with steam at atmospheric pressure to a weight of 1278 grams. The partially blanched spaghetti was weighed into 115 gram portions and inserted into a food grade, clear plastic pouches (American can). To each pouch was added 75 g. of water containing 0.48 g. of fumaric acid. The contents were allowed to equilibrate and the pH was 4.03. The pouches were heat sealed, and sterilized by placing them in water at 220° F. with an air pressure override for ten minutes. The pouches were cooled and the pressure released.

The sterilized pouches were stored for three months with no evidence of deterioration or growth of microorganisms. The spaghetti after three months storage was firm, i.e. al dente, and had no off-taste.

Some of the sterilized pouches were stored at 90° F. and inspected monthly. No evidence of deterioration was seen after six months of storage at this elevated temperature.

EXAMPLE 4

This example illustrates the preparation of spaghetti for sale in a pouch pack, which has a carbon dioxide environment.

Freshly extruded spaghetti (90 grams) made of durum granular and having a moisture content of 30 percent by weight was sprayed with steam at atmospheric pressure to a weight of 126 grams. The 126 grams of partially blanched spaghetti was inserted into a food grade, clear plastic pouch (American can). To each pouch was added 105 g. of water containing 0.84 g. of fumaric acid. Also added was one (1) gram coated sodium bicarbonate (Durkee 170-70) having a release temperature of 170° F. and containing 70 percent by weight of sodium bicarbonate. The contents were allowed to equilibrate and the pH was 3.93. The pouches were evacuated and heat sealed. The sealed pouch was allowed to stand ten

(10) minutes until the water absorbed. The pouch was then sterilized 10 minutes in an atmospheric steamer. During steaming, about 50 ml of carbon dioxide gas was evolved. The carbon dioxide gas prevented clumping and sticking of the spaghetti strands, which occurs in a vacuum packed pouch.

The sterilized pouches were stored for three months with no evidence of deterioration or growth of microorganisms. The spaghetti after three months storage was firm, i.e. al dente, and had no off-taste.

Some of the sterilized pouches were stored at 90° F. and inspected monthly. No evidence of deterioration was seen after six months of storage at the elevated temperature.

What is claimed is:

1. A process for preparing shelf stable cooked al dente pasta comprising sequentially:
  A. spraying steam on freshly extruded pasta having a water content of 25% to 35% percent by weight to partially blanch the pasta which raises the water content to 45% to 55% percent by weight;
  B. inserting measured amounts of said partially blanched and hydrated pasta into a container of food grade plastic;
  C. adding sufficient aqueous acid solution having a pH of 2.2 to 2.4 to each container to acidulate the partially blanched and hydrated pasta to a pH of 4.6 or less and to raise the water content of the pasta to about 70% by weight;
  D. sealing said containers; and
  E. sterilizing said sealed container for the equivalent of about 220° F. for about 10 minutes.

2. A process for preparing shelf stable cooked al denta pasta comprising sequentially;
  A. spraying steam on freshly extruded pasta having a water content of about 30 percent by weight to partially blanch the pasta which raises the water content to 45 to 55 percent by weight;
  B. inserting measured amounts of said partially blanched and hydrated pasta into a container of food grade plastic;
  C. adding sufficient aqueous acid solution by weight based on the weight of the partially blanched and hydrated pasta to each of said containers to acidulate the partially blanched and hydrated pasta to a pH of 4.6 or less and to raise the water content of the pasta to about 70% by weight;
  D. said solution containing about 0.8 percent of fumaric acid;
  E. sealing said containers; and
  F. sterilizing said sealed container for the equivalent of about 220° F. for about 10 minutes.

* * * * *